United States Patent [19]
Sharpe et al.

[11] 3,774,060
[45] Nov. 20, 1973

[54] FLUID COOLED DYNAMO ELECTRIC MACHINE

[75] Inventors: Raymond Sharpe, Mirfield; Peter Hunt, Shipley, both of England

[73] Assignee: Rotax Limited, Birmingham, England

[22] Filed: Aug. 5, 1971

[21] Appl. No.: 169,448

[30] Foreign Application Priority Data
Aug. 5, 1970 Great Britain .................... 37,775/70

[52] U.S. Cl. ................................................ 310/61
[51] Int. Cl. ............................................ H02k 1/32
[58] Field of Search .................. 310/52, 53, 54, 58, 310/59, 61, 63, 68 D

[56] References Cited
UNITED STATES PATENTS

| 3,480,810 | 11/1969 | Potter | 310/54 |
| 3,461,331 | 8/1969 | Pannel | 310/61 |
| 3,318,253 | 5/1967 | Campolong | 310/54 |
| 3,626,717 | 12/1971 | Lorch | 310/54 |
| 3,629,634 | 12/1971 | Dafler | 310/59 |
| 3,393,333 | 7/1968 | Kudacik | 310/61 |
| 3,145,314 | 8/1964 | Becker | 310/61 |

Primary Examiner—R. Skudy
Attorney—Holman & Stern

[57] ABSTRACT

A dynamo electric machine in which there is at least one rotatable component mounted on a shaft wherein there is provided a de-aeration chamber connected to the shaft for rotation therewith, the shaft having an axial bore along which cooling fluid can flow and the de-aeration chamber being in communication with said axial bore so that cooling fluid flowing through the bore can pass into the chamber by centrifugal force where it is de-aerated.

5 Claims, 1 Drawing Figure

PATENTED NOV 20 1973
3,774,060
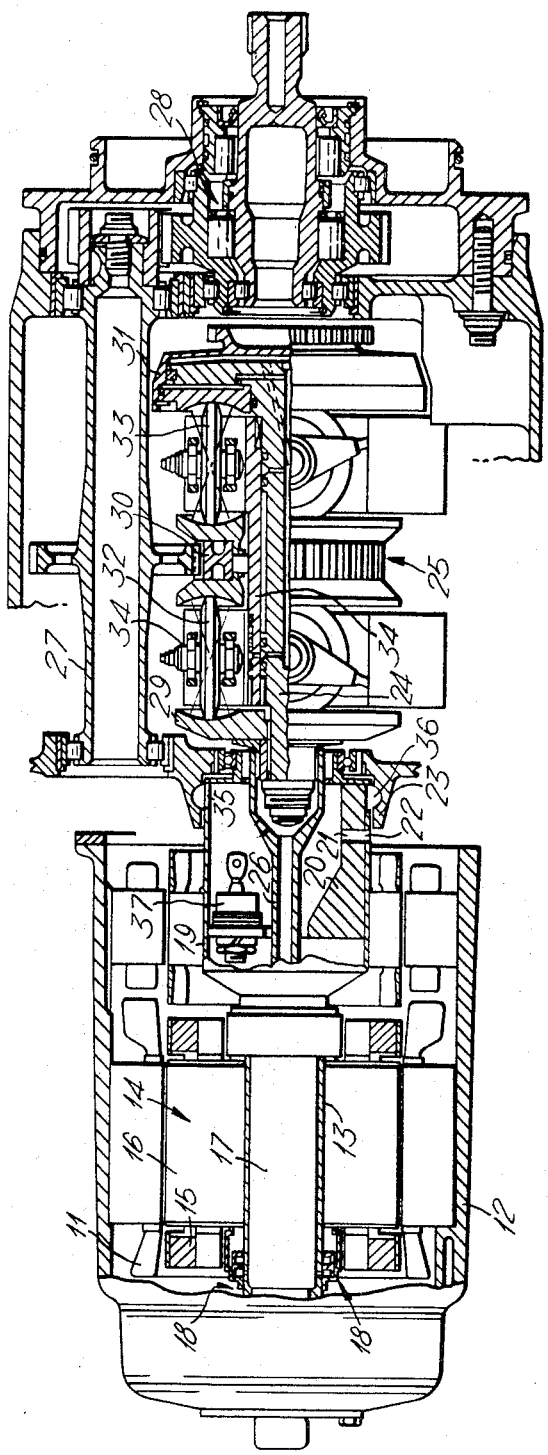
INVENTOR
Raymond Sharpe & Peter Hunt

FLUID COOLED DYNAMO ELECTRIC MACHINE

This invention relates to dynamo electric machines and has as its object the provision of such a machine in a convenient form.

In accordance with the present invention there is provided a dynamo electric machine having a rotatable shaft with at least one machine component mounted on the shaft for rotation therewith said shaft having an axial bore for the passage of cooling fluid, there being further provided a de-aeration chamber which is connected to said shaft for rotation therewith, said chamber being in communication with said axial bore in said shaft so that cooling fluid will pass into said chamber where it is de-aerated or substantially de-aerated by centrifugal force.

Conveniently, said chamber has a plurality of baffles which are secured to the inner wall of said chamber and which extend radially inwardly therefrom and each of said baffles is provided with at least one radially extending aperture which communicates with an aperture formed in the wall of said chamber, the latter being further provided with an opening which communicates with an annular passage defined by a stationary member such that the de-aerated or substantially de-aerated cooling fluid will enter said passage from where it is removed by a pump for re-circulation whilst air, foam or excess cooling fluid or any combination of the latter discharges through the aforesaid apertures formed in said baffles.

The invention will now be more particularly described with reference to the accompanying drawing which is a sectional view of a dynamo-electric machine according to the present invention in combination with a transmission system.

Referring now to the drawing, there is shown an alternator, by way of example, which includes a stator 10 having stator windings 11. A shaft 13 is journalled for rotation in a casing 12 of the alternator, bearings being provided at each end of the shaft 13. The right-hand end of the shaft 13 (as viewed in the accompanying drawing) is adapted to receive a driving device for the alternator as will be described hereinafter.

A machine component in the form of a rotor assembly 14 is mounted on the shaft 13 for rotation therewith and windings 15 are mounted on a rotor core 16 so as to provide a number of poles. The shaft 13 is formed with an axial bore 17 to provide a passage for the cooling fluid which is pumped (by means not shown) into said bore 17.

Cooling fluid distributor means which are indicated generally by the reference numeral 18 are also mounted on the shaft 13 for rotation therewith for the purpose of discharging cooling fluid onto the rotor windings. The cooling fluid distributor means 18 may be in any convenient form and may be as described in U.S. Pat. No. 3,689,786.

There is further provided a de-aeration chamber 19 which is connected to the shaft 13 for rotation therewith. This chamber has a plurality of baffles 20 which are secured to the inner wall of the chamber 19 and which are spaced circumferentially around the interior of the chamber 19 so that they extend radially inwardly therefrom. Each of the baffles 20 is provided with at least one radially extending aperture 21 which communicates with an aperture 22 formed in the wall of the chamber 19. The axial end of the chamber 19 remote from the shaft 13 is surrounded by an annulus 23 which projects outwardly from the end casing of a transmission system.

The transmission system itself has an output shaft 24 which serves as an output from a continuously variable ratio transmission unit 25. The output shaft 24 drives a load shaft 26 which is coupled to the aforesaid shaft 13 of the dynamo-electric machine so that the rotor assembly 14 and the shaft 13 are driven at a constant speed by the transmission system. The input of the variable ratio transmission unit 25 is transmitted through a lay shaft 27 from a gear train which is indicated by the reference numeral 28.

The transmission unit 25 is in the form of a frictional roller drive gear consisting of three toroidal discs 29, 30 and 31 between which two sets of rollers 32 and 33 are in frictional rolling engagement, the central disc 30 being double sided. This central toroidal disc 30 is connected to the lay shaft 27 (with freedom to move slightly axially) and is mounted on bearings around a sleeve member 34a. The outer disc 29 is secured to the output shaft 24 for rotation therewith and so as to be axially fixed with respect to the shaft 24, whilst the outer disc 31 is connected to the output shaft for rotational movement therewith and axial movement relative thereto. The drive ratio of the transmission unit 25 is varied by altering in known manner the ratio angle of the rollers, that is to say the angle about a tangential tilt axis which determines the distance from the gear axis of which the rollers 32, 33 engage the toroidal discs. The rollers 32, 33 are shown at a ratio angle at which they engage the central disc 30 at an equal radius to that of the outer discs 29 and 31 respectively, thus the variable unit as shown transmits a drive at a 1:1 ratio.

The rollers 32, 33 are mounted in roller carriages 34b and control of the ratio angle is achieved by bodily moving carriages in substantially tangential directions with respect to the gear axis, and by allowing the rollers then to steer themselves towards a different ratio angle as is more particularly described in British Pat. No. 1,146,321.

The aforesaid de-aeration chamber 19 is further provided at its end remote from the shaft 13 with an opening 35 which communicates with an annular passage 36 which is defined by the annulus 23. As shown in the drawing a component such as a rectifier 37 may be mounted within the chamber 19 so that it can be cooled by any cooling fluid entering this chamber.

In use, the shaft 13 is driven by the transmission system at a constant speed and cooling fluid is fed into the axial bore 17 formed in the shaft 13. Some of this cooling fluid will be discharged from the axial bore 17 via the fluid distributor means 18 onto the rotor windings 15. However, some of the fluid which enters the axial bore 17 will flow into the chamber 19, it being understood that this cooling fluid will be substantially aerated. The cooling fluid passing into the chamber 19 will be flung outwardly against the outer walls of this chamber 19 by centrifugal force, and the cooling fluid will form an annular layer against the inner surface of the wall of the chamber 19. Since the cooling fluid itself is heavier than air or foam, de-aerated or substantially de-aerated cooling fluid will be disposed nearest the inner surface of the wall 19 whilst the foam and air will be disposed radially inwardly of this aforesaid de-aerated or substantially de-aerated cooling fluid. The de-aerated cooling fluid will then pass through the opening 35 into the annular passage 36 from where it may be removed by a pump for re-circulation, such de-aerated cooling fluid may for example be used in the lubricating system of the transmission system. Air, foam or excess cooling fluid or any combination of the latter can, inter alia, discharge through the apertures 21 which are formed in the baffles 20. It will be appreciated that any cooling fluid which is disposed within the chamber 19 (when the shaft 13 is being rotated) and radially outwardly of those ends of the apertures 21 remote from the wall of the chamber 19, then this cooling fluid will pass through the operning 35 and into the annular passage 36. Furthermore, any cooling fluid, air or foam which is in use disposed radially inwardly of the aforesaid ends of the apertures 21 will be discharged outwardly through these apertures 21 formed in the baffles 20 and then through the apertures 22 formed in the wall of the chamber 19, by centrifugal force.

Although in the above-described embodiment of the invention reference has been made to the provision of a plurality of baffles 20 secured to the inner surface of the chamber 19 these baffles may be replaced by radially extending tubes which project inwardly through the wall of the chamber 19 so that their innermost ends are disposed a predetermined distance radially inwardly of the inner surface of the wall of the chamber 19. These tubes will thus serve the same purpose as the aforesaid apertures formed in the baffles 20.

We claim:
1. A dynamo electric machine having a rotatable shaft with at least one component mounted on the shaft for rotation therewith, said shaft having an axial bore for the passage of cooling fluid, there being further provided a de-aeration chamber which is connected to said shaft for rotation therewith, said chamber being in communication with said axial bore in said shaft and having a plurality of baffles which are secured in said chamber and which extend radially inwardly therefrom, so that cooling fluid will pass into said chamber where it is de-aerated by centrifugal force.

2. A dynamo electric machine as claimed in claim 1 wherein each of said baffles is provided with at least one radially extending aperture which communicates with an aperture formed in the wall of said chamber.

3. A dynamo electric machine as claimed in claim 1 wherein an opening is provided in the wall of said chamber, said opening forming a direct communication between said chamber and an annular passage which is defined by a stationary member surrounding said opening.

4. A dynamo electric machine as claimed in claim 1 wherein there is provided cooling fluid distributor means mounted on said shaft for discharging cooling fluid onto said components.

5. A dynamo electric machine as claimed in claim 1 wherein a rectifier is mounted within said de-aeration chamber where it can be cooled by the cooling fluid entering said chamber.

* * * * *